(12) United States Patent
Petersen

(10) Patent No.: US 7,405,492 B1
(45) Date of Patent: Jul. 29, 2008

(54) TWIN IGNITION SYSTEM

(76) Inventor: Peter William Petersen, 1217 Village Dr., Arlington Heights, IL (US) 60004

( * ) Notice: Subject to any disclaimer, the term of this patent is extended or adjusted under 35 U.S.C. 154(b) by 0 days.

(21) Appl. No.: 11/700,454

(22) Filed: Jan. 31, 2007

(51) Int. Cl.
*B60R 22/00* (2006.01)
(52) U.S. Cl. .................................................. 307/10.6
(58) Field of Classification Search .............. 307/10.3, 307/10.6
See application file for complete search history.

(56) References Cited

U.S. PATENT DOCUMENTS 5,803,043 A * 9/1998 Bayron et al. ............... 123/335
6,886,653 B1 * 5/2005 Bellehumeur ............... 180/272

\* cited by examiner

*Primary Examiner*—Robert L. Deberadinis
(74) *Attorney, Agent, or Firm*—Holland & Knight LLP

(57) ABSTRACT

A twin ignition system for automotive vehicles and the like is disclosed and claimed. Ignition system #1 comprises a known ignition system which allows electrical access to the engine starter, and allows full function of all facilities with which the vehicle is equipped. Ignition system #2 has its own subsystems which can be set to control vehicle speed and/or other vehicle operating parameters. Each system can be accessed by its own discreet key which does not allow access to the other ignition system.

9 Claims, 1 Drawing Sheet

# TWIN IGNITION SYSTEM

My invention is a system that would give society and the automotive industry more control over teen age (or other) drivers who may be of restricted capacity or capability (see explanation below). The invention is what I term a "twin ignition system."

The "twin ignition system" would entail a vehicle having two separate ignition systems under the hood. At present, most all cars have one box that allows full function of all facilities with which the vehicle is equipped. This is "Ignition Systems #1." This remains as it is. For special circumstances, however, we have "Ignition System #2."

Ignition System #2 has its own subsystems which can be set to control m.p.h. (speed) or other vehicle operating parameters. This system #2 can be configured to limit the maximum speed that the vehicle may travel. This maximum speed would be determined by law and would be required for use by teenage or other new drivers or others as determined by law (such as reckless drivers or those on driving probation). The system could also be configured to deny engine starts and/or vehicle operations to those who have access to Ignition System #2, but who are impaired by alcohol or other substances, or who are legally or otherwise restricted to certain routes or areas of travel.

Each ignition system would have its own key and neither key would activate the other system. The object of "Ignition System #2" is to give new drivers a chance to become accustomed to handling a car at different speeds up to the speed limit and driving in traffic in a responsible manner or to restrict impaired drivers to safe driving parameters.

One possible feature of this #2 ignition system is that a notification "system" would illuminate. For example, one visible light could be situated in the front and one in the back of the car. Other drivers would recognize that the red light indicates a "learner" is driving, and that added respect or caution may be required. Other indicia could be used. Police would also pay special attention, if the car is being driven erratically.

DETAILED DESCRIPTION

Figure 1:
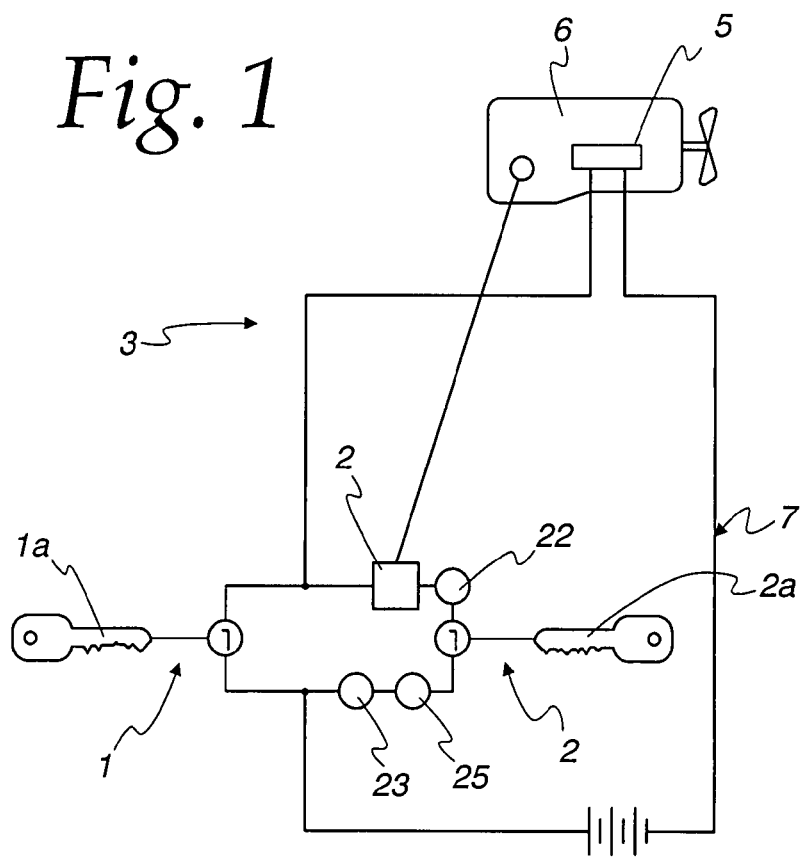
FIG. 1 is a schematic drawing of the main elements of this novel and inventive system.
Figure 2:
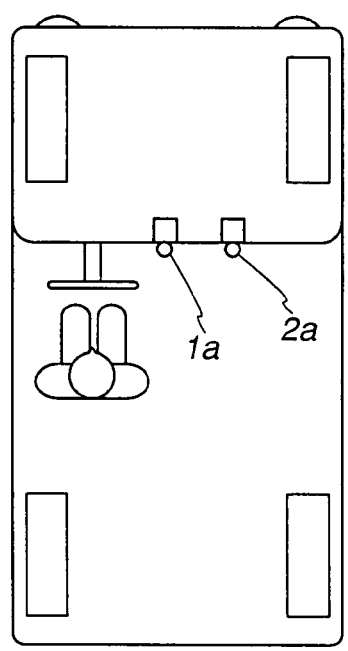
FIG. 2 is a schematic drawing of an automobile having an example of the invention installed in it.

It is a feature of the invention that the invention can be constructed by connecting known parts or subsystems in an appropriate circuit to provide the surprising and highly useful effects alluded to above. In the specific embodiment suggested in the drawing, the alternate ignition systems 1 and 2 are connected in parallel with one another within a known engine starter system 3, which comprises a battery 4 or other power source, and a starter motor 5 or equivalent device which is mounted upon and connected to a conventional automotive engine 6. The precise wiring 7 can be of any known type.

Ignition system 1 can be conventional, and requires only a conventional key 1a to start the engine and operate the vehicle without restriction. Key 1a can be kept and used by careful, unimpaired, experienced drivers.

Ignition system 2, however, cannot be engaged or accessed by key 1a, but only by key 2a. Key 2a can be given to a student driver, an inexperienced driver, or driver who is or might become impaired in some way. As illustrated in the schematic diagram, ignition system 2 can include an engine or vehicle speed governor 21, and/or an alcohol or impairment sensor 22 and/or special warning or caution lights 23, any of which can be connected in electrical series or otherwise with ignition system 2. The caution lights 23 can be mounted on the outside of the vehicle or otherwise located so as to notify other drivers or law-enforcement personnel that an inexperienced or restricted driver is operating the vehicle.

In many geographical areas, judicial traffic courts or medical facilities are empowered to restrict drivers license holders to a specific route of travel or specific geographical area. For example, persons convicted of drunk driving may be permitted by a traffic court to travel only along certain routes between the drivers license holder's residence and place of work. In other cases, medical patients may be restricted by a doctor's orders to driving privileges to be exercised only within a particular city or certain county. To implement these restrictions in accordance with one aspect of the invention, a programmable Global Positioning System 25 can be wired into the circuitry 3. This GPS system 25 can be preprogrammed with one or more discreet and particular routes of vehicle travel; and/or it can be preprogrammed so that, if the GPS system 25 senses that the vehicle has deviated from the preprogrammed area or route of travel by more than a nominal amount, the GPS system 25 opens the ignition switch circuitry 2 so as to shut off the engine 6 and consequently halt vehicle movement.

It will be apparent to those skilled in the art that alternate embodiments of the circuitry and alternate subsystems can be employed without deviating from the invention.

The invention claimed is:

1. A multiple ignition system for a vehicle, comprising in combination, a power source, a starter motor;
   and a first and second ignition system electrically connected between the power source and the starter motor, whereby the first ignition system, when used independently, is capable of providing full function of all facilities with which the vehicle is equipped; and the second ignition system, when used independently, provides only limited functionality of facilities with which the vehicle is equipped,
   the second ignition system including governing means for signaling or restricting operation of the ignition circuitry and, consequently, the vehicle under predetermined circumstances.

2. A multiple ignition system according to claim 1 wherein said governing means includes a vehicle speed governor.

3. A multiple ignition system according to claim 1 wherein said governing means includes an impairment sensor.

4. A multiple ignition system according to claim 3 wherein said impairment means includes an alcohol impairment sensor.

5. A multiple ignition system according to claim 1 further including cautionary light illuminating circuitry whereby the cautionary light illuminating circuitry illuminates a cautionary light visible to those outside the vehicle when the vehicle is operated utilizing the second ignition system.

6. A multiple ignition system for an automobile providing different functioning capabilities of the automobile based upon which ignition system has been utilized comprising:
   a power source;
   a starter motor;
   a fully functional ignition system electrically connected between the power source and the starter motor comprising a first key such that all facilities of the automobile are fully functional after the automobile is started utilizing the fully functional ignition system;

a restricted ignition system electrically connected between the power source and the starter motor comprising a second key such that at least one facility of the automobile is not fully functional after the automobile is started utilizing the restricted ignition system; and a cautionary light visible to those outside the automobile which illuminates only when the automobile has been started utilizing the restricted ignition system so as to notify others that the automobile is being operated in a restrictive means.

7. The multiple ignition system of claim 6 whereby the at least one facility of the automobile that is not fully functional after the automobile is started utilizing the restricted ignition system comprises:

a speed governor for limiting the maximum speed of the automobile.

8. The multiple ignition system of claim 6 whereby the cautionary light displays "TEENAGE DRIVER."

9. A method of providing safer teenage drivers on the road comprising:

equipping a vehicle with a dual ignition system such that the first ignition system provides full functionality of the vehicle and the second ignition system provides only limited functionality of the vehicle whereby the second ignition system limits the maximum speed of the vehicle;

providing a cautionary lighting system to inform other drivers when the vehicle is being operated by a teenage driver;

providing an adult driver a fully functional key for engaging the first ignition system of the vehicle;

providing a teenage driver a restricted key for engaging the second ignition system of the vehicle;

illuminating the cautionary lighting system when the teenage driver operates the vehicle utilizing the restricted key; and limiting the maximum speed of the vehicle when the teenage driver operates the vehicle utilizing the restricted key.

* * * * *